No. 697,217. Patented Apr. 8, 1902.
J. H. PEARCE.
MACHINE FOR WORKING RUBBER.
(Application filed Apr. 22, 1901.)
(No Model.) 5 Sheets—Sheet 1.

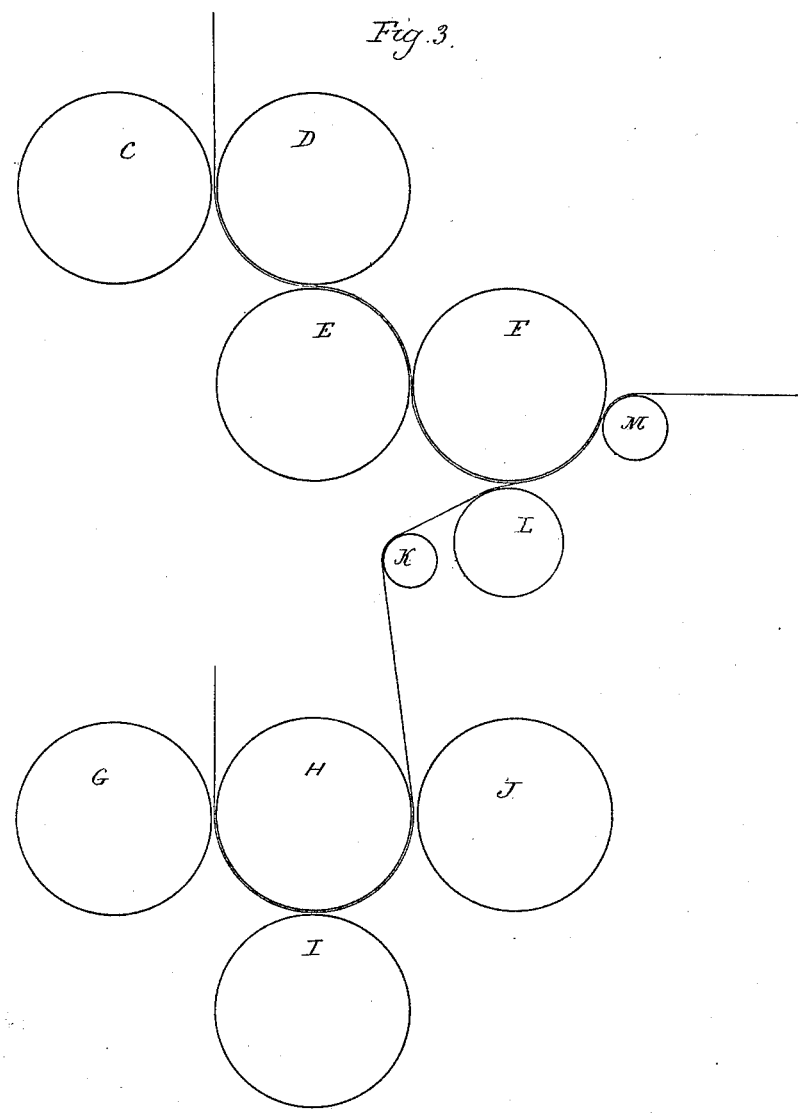

No. 697,217. Patented Apr. 8, 1902.
J. H. PEARCE.
MACHINE FOR WORKING RUBBER.
(Application filed Apr. 22, 1901.)
(No Model.) 5 Sheets—Sheet 4.
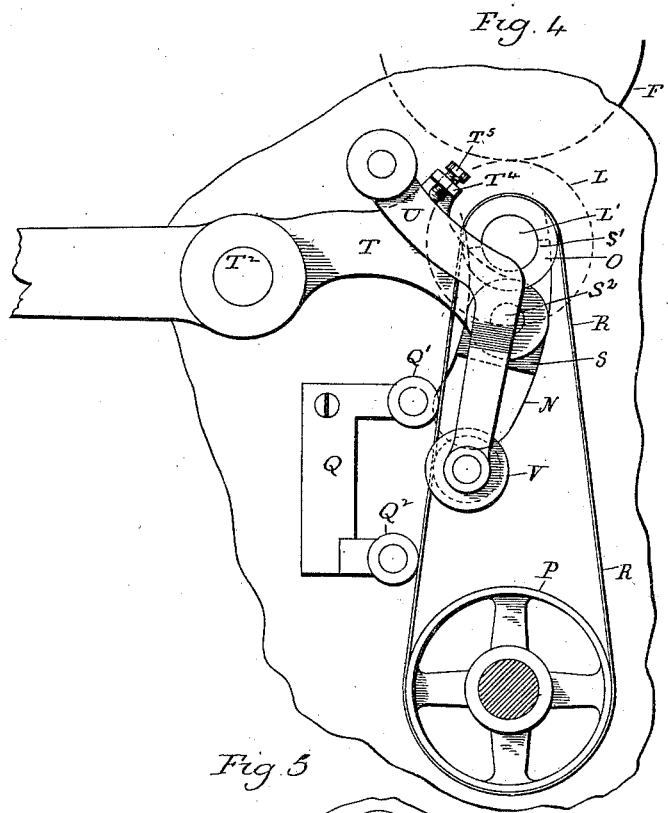
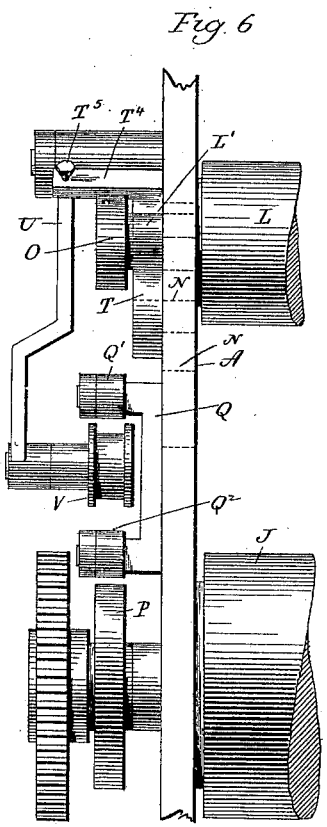
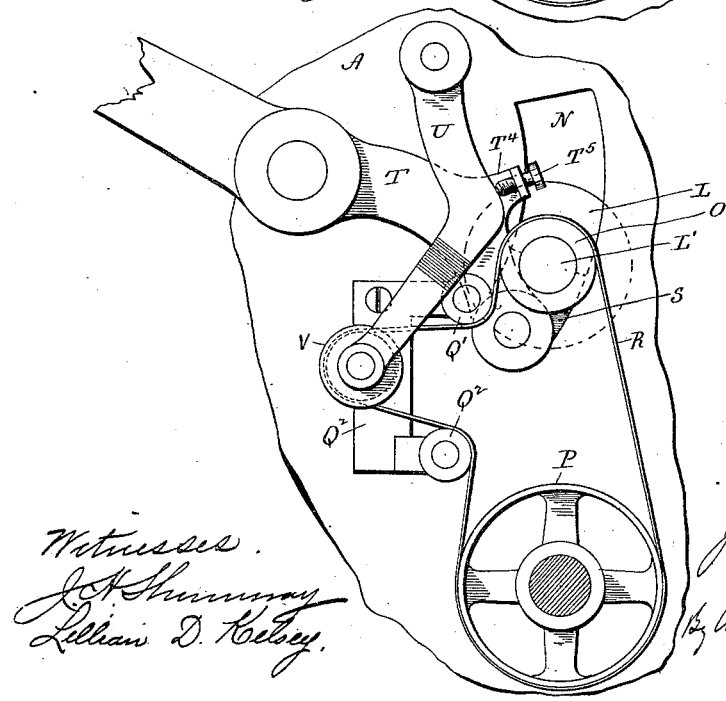

No. 697,217. Patented Apr. 8, 1902.
J. H. PEARCE.
MACHINE FOR WORKING RUBBER.
(Application filed Apr. 22, 1901.)
(No Model.) 5 Sheets—Sheet 5.

UNITED STATES PATENT OFFICE.

JOHN H. PEARCE, OF NEW HAVEN, CONNECTICUT, ASSIGNOR TO HENRY STUART HOTCHKISS, OF NEW HAVEN, CONNECTICUT.

MACHINE FOR WORKING RUBBER.

SPECIFICATION forming part of Letters Patent No. 697,217, dated April 8, 1902.

Application filed April 22, 1901. Serial No. 56,905. (No model.)

*To all whom it may concern:*

Be it known that I, JOHN H. PEARCE, of New Haven, in the county of New Haven and State of Connecticut, have invented a new Improvement in Machines for Working Rubber; and I do hereby declare the following, when taken in connection with the accompanying drawings and the characters of reference marked thereon, to be a full, clear, and exact description of the same, and which said drawings constitute part of this specification, and represent, in—

Figure 1:
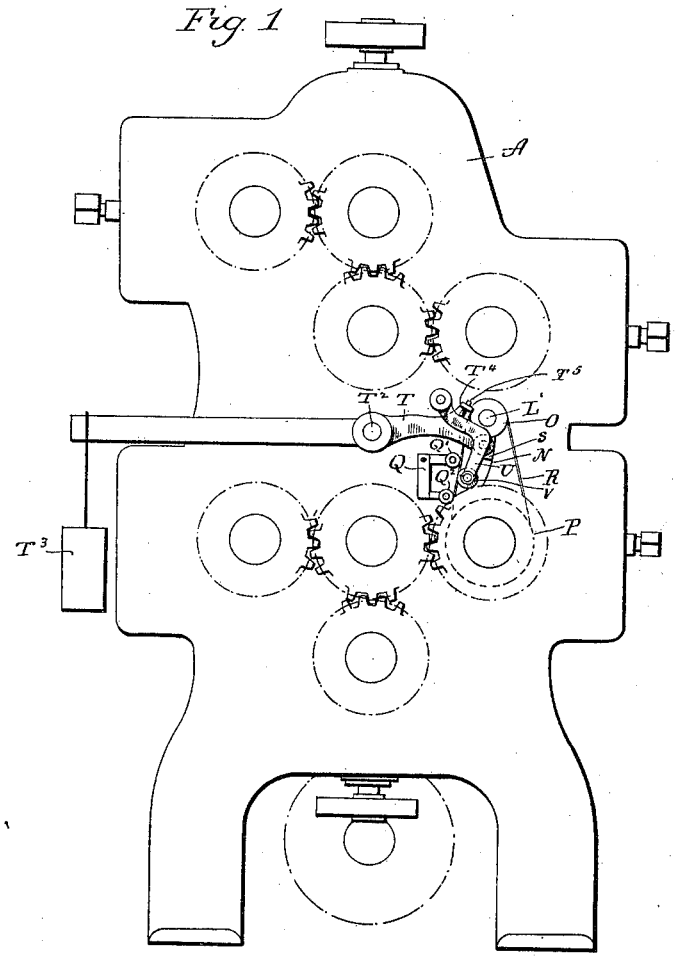
Figure 2:
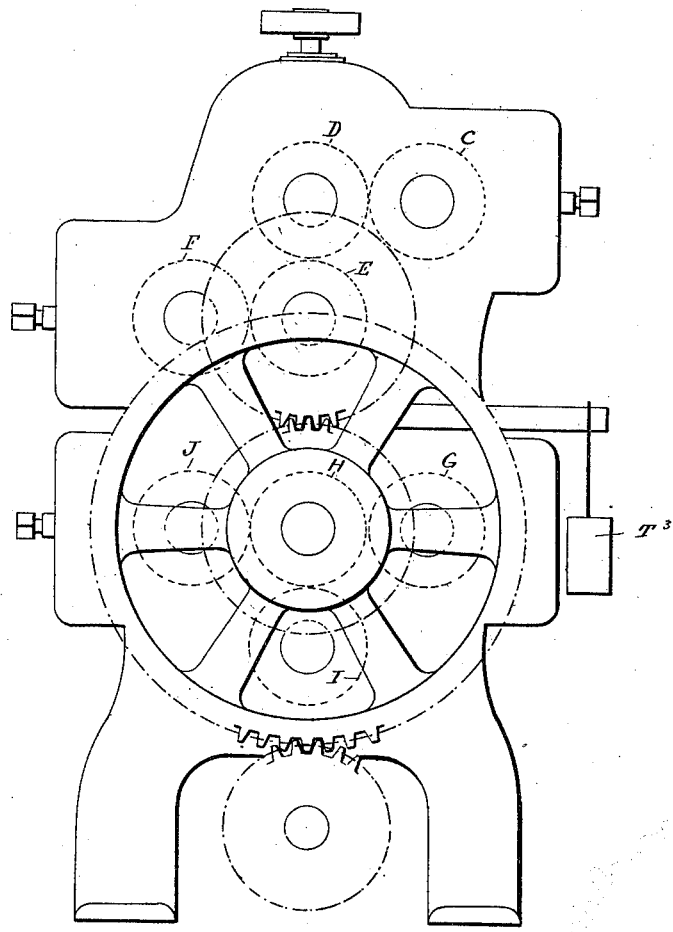
Figure 7:
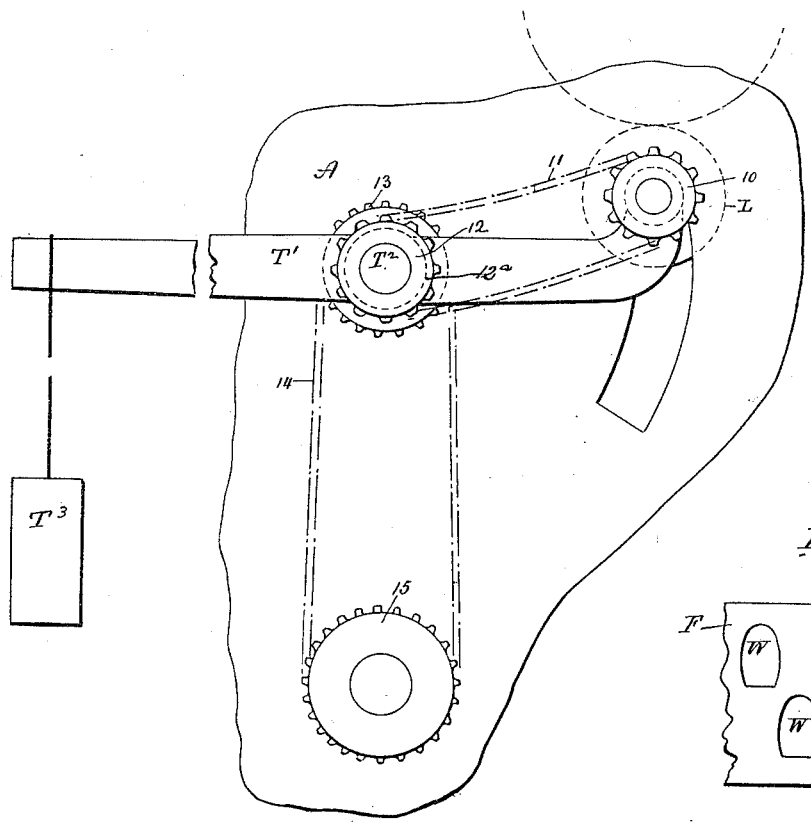
Figure 8:
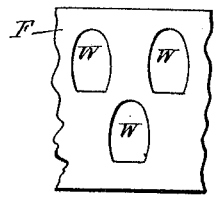

Figure 1, a view in side elevation of one form which a machine constructed in accordance with my invention may assume; Fig. 2, a similar view of the other side of the machine; Fig. 3, a diagrammatic view showing the arrangement of the rolls; Fig. 4, a broken detail view showing one of the pressure-levers employed for carrying the pressure-roll and the secondary driving mechanism for driving the said roll when it is not frictionally driven by the finishing-roll, the pressure-roll and pressure-lever being shown in their normal positions and the secondary driving mechanism being shown out of action; Fig. 5, a broken detail view showing the pressure-roll moved away from the finishing-roll and the secondary driving mechanism brought into operation for driving the said pressure-roll; Fig. 6, a broken front view of the parts shown in Figs. 4 and 5 with the driving-belt of the secondary driving mechanism of the pressure-roll removed; Fig. 7, a broken view in side elevation of one of the modified forms which the secondary driving mechanism of the pressure-roll may assume; Fig. 8, a broken view of one of the forms which the finishing-roll may assume, the said finishing-roll being shown suitably incised as for the production of sole-taps.

My invention relates to an improvement in that class of machines for working rubber in which a plurality of films are formed and united and blended into one composite but homogeneous sheet in which the air-bubbles occurring in the respective single films are neutralized, the object of my invention being to produce a compact, convenient, and effective machine adapted to be used not only in the production of composite sheets having both sides plain or smooth, but also in the production of sheets figured on one side as well as sheets containing segregable forms, such as sole-taps.

With these ends in view my invention consists in a rubber-working machine having certain details of construction and combinations of parts, as will be hereinafter described, and pointed out in the claims.

As herein shown, the machine is furnished with an upper and lower series of rolls, each series constituting an independent film-forming mechanism. The upper series of rolls comprises an adjustable feed-roll C, an adjustable feed and reducing roll D, a reducing and finishing roll E, and an adjustable reducing, finishing, and "knurling" roll F, which it is designed shall be interchanged with other rolls differently cut or incised according to the character of the work to be done, or with a plain roll in case the product is to have both surfaces plain or smooth. I shall hereinafter speak of the roll F as the "incised finishing-roll," using the term "incised" to cover cutting of whatever character and whether designed to produce figured stock to be used as such or stock containing segregable forms, such as sole or heel taps. When the roll F is incised for the production of an ornamental figure or design, it would properly be called an "embossing-roll." When cut to produce segregable forms, it would be designated by some other term. Thus rolls incised for the production of sole-taps and combined sole and heel taps are technically known in the art as "knurling-rolls." I have therefore adopted the term "incised finishing-roll" as a generic term for this roll. As shown, it has sole-shaped pockets W cut in at regular intervals. The lower series of rolls comprises a feed-roll G, a feed, reducing, and finishing roll H, an adjustable reducing-roll I, and an adjustable finishing-roll J.

The adjustment of the adjustable rolls of the upper and lower series of rolls is effected in the ordinary manner and does not need a detailed illustration or description, nor is it necessary to enter into a detailed description of the means employed for driving them, as such means may be widely varied and are well known.

Between the upper and lower series of rolls I locate a pressure-roll L, the upper surface of which is designed to coact with the lower surface of the incised finishing-roll F of the upper series of rolls. Between the upper and lower series of rolls I also locate a vertically-adjustable guide-roll K, which is raised or lowered as required to cause the film produced by the lower series of rolls to enter the "bite" of the finishing-roll F and the pressure-roll L at the angle required for avoiding air-bubbles. This is necessary because the interchangeable roll F may vary in diameter. Thus it may be reduced in diameter by being cut down to change the design. In that case the pressure-roll would rise, and this would require the raising of the guide-roll K. A conveyer-roll M is also employed to lead the finished composite film away from the machine.

The pressure-roll L is normally driven frictionally by the roll F, against which it is pressed; but in starting up the machine, as well as in clearing out the machine after the required amount of stock has been run through it, it is necessary to drive the pressure-roll independently of the finishing-roll F, and for this purpose secondary driving mechanism is employed for the pressure-roll. To provide for these requirements, the journals L' of the pressure-roll are located in suitable semicircular seats S', formed in the upper ends of two segmental boxes S, located in two segmental slots respectively formed in the uprights A and B of the machine-frame. The said boxes S are connected by means of short studs $S^2$ with the rounded forward ends of two long pressure-levers T, hung upon studs $T^2$, mounted in the said uprights A and B, having long rear ends carrying weights $T^3$, which when the machine is running hold the pressure-roll, as shown in Fig. 4, up against the finishing-roll F with sufficient force to cause it to be frictionally driven thereby. When the weights $T^3$ are removed from the levers T, the pressure-roll descends by gravity in a curved path following the curvature of the segmental slots N, in which the boxes S at this time descend, as shown in Fig. 5.

For driving the pressure-roll in its depressed or, as I prefer to say, "retired" position I provide its left-hand-end trunnion with a belt-pulley O, over which runs a belt R, also running over a pulley P, mounted upon the left-hand journal of the roll J of the lower series of rolls. This belt is so loose that when the pressure-roll L is coacting with the finishing-roll F the belt slips over the pulley O of the pressure-roll. When, however, the pressure-roll is lowered into its retired position, an adjustable screw $T^5$ mounted in the left-hand pressure-lever T engages with the upper edge of a belt-tightening lever U, swung from the upright A at a point above the left-hand pressure-lever T and provided at its lower end with a flanged roller V, located within the belt, whereby the said lever is swung outwardly, so as to push the belt R outward between two antifriction-rollers Q' and $Q^2$, mounted in a frame Q, secured to the said left-hand upright A of the machine-frame. In this way the slack of the belt is taken up and it is caused to drive the pressure-roll. It will thus be seen that when the pressure-roll L is retired and cleared from the finishing-roll F, by which it is frictionally driven, the secondary driving mechanism provided for it is automatically brought into action.

In starting the machine the weights $T^3$ are removed, so as to allow the pressure-roll to drop into its retired position. The machine is then started up and stock is run through the lower series of rolls and over the pressure-roll, which is now being driven by its secondary driving mechanism. The rolls of the lower series are now adjusted until a film is produced of the desired weight and thickness. At this time the pressure-roll has no pressure function, but performs the function of carrying away or discharging from the machine the film produced by the lower rolls while the same are being adjusted. At the same time stock is run through the rolls of the upper series of rolls, which are also adjusted until a film of the desired weight and thickness is being produced, the film produced by them during this adjusting operation being conveyed away by the conveyer-roll M. When both series of rolls have been properly adjusted and the machine is producing two films of the required weight and thickness, the film produced by the lower series of rolls is cut in front of the pressure-roll and the weights $T^3$ restored to the pressure-levers T, whereby the same are caused to swing so as to lift the pressure-roll up against the finishing-roll F. As the pressure-roll is raised in this manner the belt-tightening lever U swings back into its normal position, whereby the belt R is loosened and the secondary driving mechanism of the pressure-roller automatically cut out of action. The two films being produced by the respective series of rolls are now united and blended between the pressure-roll and the finishing-roll at a point on the finishing-roll in advance, so to speak, of the point thereon where the same coacts with the finishing and reducing roll E and before the film produced by the upper series of rolls leaves the finishing-roll F. This is essential in case the finishing-roll F is an incised roll, because those portions of the film driven into its incisions must be in place therein when the film produced by the lower series of rolls is united to its under surface. By uniting the two films almost as soon as they are produced and before they leave the machine any air-bubbles occurring in one film will be neutralized by the other film, and vice versa, because, of course, the air-bubbles in one film will not in the nature of things register with those of the other film, their occurrence being irregular. The composite film thus produced is solider and more homogeneous, and consequently better adapted to be worked up into heavy stock than any equally heavy single sheet that can be formed. This is particularly true of the production of the heavy soling stock used in making rubber boots and shoes. It will be understood, of course, that the uneven surface produced by the incised roll will always be exposed on one side of the product.

When the machine is used for producing, say, sole-taps, nearly the entire thickness of the film produced by the upper rolls is taken up by the taps which occur, so to speak, at regular intervals in a very thin film, which adheres to one side of the film produced in the lower series of rolls, the film last mentioned also increasing the thickness of the taps. When such a composite film issues from the machine, it is cut up with a flange about each segregable sole-tap, which flange is used in securing it in place.

In the modified construction shown by Fig. 7 of the drawings the belt for driving the pressure-roll is dispensed with and the left-hand journal of the roll provided with a loose sprocket-wheel 10, over which runs a sprocket-chain 11, also running over a sprocket-wheel 12, secured to a sleeve 12ª, mounted upon the stud T² of the left-hand pressure-lever T. The said sleeve also carries a larger sprocket-wheel 13, over which runs a sprocket-chain 14, also running over a sprocket-wheel 15, which corresponds to the pulley P, already referred to. The two sprocket-chains 11 and 14 are constantly driven; but as the sprocket-wheel 10 is normally loose with reference to the pressure-roll the same will not be driven except when manually coupled therewith by a mechanism not necessary to be described, the sprocket-wheel 10 being manually coupled to the pressure-roll, as it is desired to run the same independently of the finishing-roll F.

Of course the machine might be provided with three or more film-forming mechanisms, if desired, to produce three-ply or four-ply sheets, and so on, or one or both series of rolls might be arranged to produce more than one film by feeding and leading the crude stock through them in a manner well known to those familiar with this art. I would therefore have it understood that I do not limit myself to the particular mechanism shown and described, but hold myself at liberty to make such changes and alterations as fairly fall within the spirit and scope of my invention.

Having fully described my invention, what I claim as new, and desire to secure by Letters Patent, is—

1. In a machine for working rubber, the combination with a plurality of film-forming mechanisms, one of which includes a finishing-roll, a pressure-roll arranged to coact directly with the said finishing-roll for uniting and blending into one sheet the several films produced by the several film-forming mechanisms, and means connected with the pressure-roll for moving it toward and away from the said finishing-roll causing it to automatically accommodate its position to variations in the thickness of the films.

2. In a machine for working rubber, the combination with a plurality of film-forming mechanisms, one of which includes a finishing-roll, a pressure-roll arranged to coact directly with the said finishing-roll for uniting and blending into one sheet the several films produced by the several film-forming mechanisms, and means connected with the pressure-roll for causing it to automatically accommodate its position to variations in the thickness of the films.

3. In a machine for working rubber, the combination with a plurality of film-forming mechanisms, one of which includes an incised finishing-roll, and a pressure-roll arranged to coact directly with the said finishing-roll, whereby the films produced by the respective film-forming mechanisms are united and blended between the said finishing-roll and the said pressure-roll after the finishing-roll has acted upon one film and before that film has left its surface.

4. In a machine for working rubber, the combination with a plurality of film-forming mechanisms, one of which includes an incised finishing-roll, of a pressure-roll arranged to have its upper surface coact directly with the lower surface of the said finishing-roll, whereby the films produced by the respective film-forming mechanisms are united and blended between the finishing-roll and the pressure-roll after the finishing-roll has acted upon one film and before that film has left its surface.

5. In a machine for working rubber, the combination with an upper series of rolls including a finishing-roll, for producing a film of rubber, of a lower series of rolls for producing a film of rubber, and a pressure-roll located between the two series of rolls in position to have its upper surface coact directly with the lower surface of the finishing-roll of the upper series, the films produced by the respective series of rolls being passed between the said finishing-roll of the upper series and the upper surface of the pressure-roll, whereby the said films are united and blended together after the finishing-roll has acted upon one film and before that film has left its surface.

6. In a machine for working rubber, the combination with a plurality of film-producing mechanisms, one of which includes a finishing-roll, of a pressure-roll coacting directly with the said finishing-roll for uniting and blending the respective films formed by the said mechanisms, the said pressure-roll being driven frictionally by the said finishing-roll when coacting therewith, and means connected with said pressure-roll for rotating it independently of the said finishing-roll.

7. In a machine for working rubber, the combination with a plurality of film-producing mechanisms, one of which includes a finishing-roll, of a pressure-roll coacting directly with the said finishing-roll for uniting and blending the respective films formed by the said mechanisms, the said pressure-roll being driven frictionally by the said finishing-roll when coacting therewith, and means for rotating the said pressure-roll independently of the said friction-roll and automatically brought into operation when the said pressure-roll is moved away from the finishing-roll and cut out of operation when it is moved up to the same.

8. In a machine for working rubber, the combination with a plurality of film-forming mechanisms, one of which includes a finishing-roll, of a pressure-roll coacting directly with the said finishing-roll for uniting and blending the respective films formed by the said mechanisms, the said pressure-roll being frictionally driven by the said finishing-roll when coacting therewith, movable supports for the pressure-roll by which it is moved toward and away from the said finishing-roll, and a driving mechanism for the pressure-roll automatically brought into action for driving the said pressure-roll when the same is moved away from the finishing-roll and automatically cut out of action when the said pressure-roll is moved up to the said finishing-roll.

9. In a machine for working rubber, the combination with a plurality of film-forming mechanisms, one of which includes a finishing-roll, of a pressure-roll coacting directly with the said finishing-roll for uniting and blending the films into one composite sheet, and an adjustable guide-roll coacting with the said finishing and pressure rolls.

10. In a machine for working rubber, the combination with a plurality of film-forming mechanisms one of which includes a finishing-roll, of a pressure-roll coacting directly with the said finishing-roll for uniting and blending the films into one composite sheet, pressure-levers carrying the said pressure-roll and movable toward and away from the said finishing-roll, and means for driving the said pressure-roll independently of the said finishing-roll which normally drives it frictionally.

11. In a rubber-working machine, the combination with a plurality of film-forming mechanisms, one of which produces a film of uneven surface, of means for uniting and blending the films including that having an uneven surface, so as to produce a composite sheet with the uneven surface of the film of uneven surface exposed on one side of the said sheet.

12. In a machine for working rubber, the combination with a plurality of film-forming mechanisms, one of the said mechanisms having an incised finishing-roll, of a pressure-roll coacting with the said incised roll for uniting and blending on the incised roll before the film acted upon thereby has left its surface, the several films produced in the machine.

In testimony whereof I have signed this specification in the presence of two subscribing witnesses.

JOHN H. PEARCE.

Witnesses:
FREDERIC C. EARLE,
LILLIAN D. KELSEY.